US012723603B2

(12) United States Patent
Bertolin et al.

(10) Patent No.: US 12,723,603 B2
(45) **Date of Patent: *Sep. 1, 2026**

(54) METHOD AND SYSTEM FOR A FLOW-ISOLATED VALVE ARRANGEMENT AND A THREE-CHAMBER CYLINDER HYDRAULIC ARCHITECTURE

(71) Applicants: Purdue Research Foundation, West Lafayette, IN (US); Wipro Enterprises Pvt Ltd, Koramangala (IN)

(72) Inventors: Mateus Bertolin, London (GB); Xiaofan Guo, West Lafayette, IN (US); Andrea Vacca, West Lafayette, IN (US); Jan Nilsson, Skellefteå (SE)

(73) Assignees: Purdue Research Foundation, West Lafayette, IN (US); Wipro Enterprises Pvt Ltd, Koramangala (IN)

( * ) Notice: Subject to any disclaimer, the term of this patent is extended or adjusted under 35 U.S.C. 154(b) by 0 days.

This patent is subject to a terminal disclaimer.

(21) Appl. No.: 19/197,596

(22) Filed: May 2, 2025

(65) Prior Publication Data

US 2025/0264118 A1 Aug. 21, 2025

Related U.S. Application Data

(63) Continuation of application No. 18/701,912, filed as application No. PCT/US2022/047178 on Oct. 19, 2022, now Pat. No. 12,292,062.

(Continued)

(51) Int. Cl.
*F15B 11/036* (2006.01)
*F15B 11/028* (2006.01)
*F15B 11/042* (2006.01)

(52) U.S. Cl.
CPC .......... *F15B 11/036* (2013.01); *F15B 11/028* (2013.01); *F15B 11/0426* (2013.01);
(Continued)

(58) Field of Classification Search
CPC ... F15B 11/028; F15B 11/036; F15B 11/0426; F15B 11/044; F15B 11/055;
(Continued)

(56) References Cited

U.S. PATENT DOCUMENTS 4,369,625 A * 1/1983 Izumi .................... E02F 9/2242 414/699
5,011,180 A * 4/1991 Dunwoody ........ B60G 17/0152 188/297

(Continued)

FOREIGN PATENT DOCUMENTS

DE 10 2015 116 761.1 4/2017

*Primary Examiner* — Michael Leslie
(74) *Attorney, Agent, or Firm* — Piroozi-IP, LLC

(57) ABSTRACT

A valve arrangement includes a plurality of hydraulic rail ports each configured to be coupled to a pressure rail, a plurality of hydraulic chamber ports each configured to be coupled to a chamber of one or more actuators, a plurality of proportional valves each corresponding to one of the plurality of hydraulic chamber ports, one or more sets of on-off valves and check valves coupling two or more hydraulic rail ports to each of the supply sides of each of the plurality of proportional valves, and one or more sets of on-off valves and check valves coupling two or more hydraulic rail ports to each of the return sides of each of the plurality of proportional valves, wherein electively operating each of the on-off valves and the proportional valves provides selective pressure or flow to each one of the plurality of hydraulic chamber ports.

18 Claims, 16 Drawing Sheets

Related U.S. Application Data

(60) Provisional application No. 63/257,540, filed on Oct. 19, 2021, provisional application No. 63/257,537, filed on Oct. 19, 2021, provisional application No. 63/257,545, filed on Oct. 19, 2021.

(52) U.S. Cl.
CPC ............... *F15B 2211/20592* (2013.01); *F15B 2211/30505* (2013.01); *F15B 2211/30565* (2013.01); *F15B 2211/327* (2013.01); *F15B 2211/6653* (2013.01)

(58) Field of Classification Search
CPC .. F15B 2211/20515; F15B 2211/20523; F15B 2211/20576; F15B 2211/30505; F15B 2211/30565; F15B 2211/3057; F15B 2211/31535
See application file for complete search history.

(56) References Cited

U.S. PATENT DOCUMENTS

| | | | | | |
|---|---|---|---|---|---|
| 5,259,738 | A * | 11/1993 | Salter | F04B 49/065 417/270 | |
| 7,475,538 | B2 * | 1/2009 | Bishop | E02F 9/22 60/567 | |
| 8,635,939 | B2 * | 1/2014 | Linjama | F04B 49/03 91/465 | |
| 9,021,798 | B2 * | 5/2015 | Sipola | F15B 21/14 60/428 | |
| 9,494,168 | B2 * | 11/2016 | Lind | F15B 11/036 | |
| 10,161,423 | B2 * | 12/2018 | Rampen | F15B 11/162 | |
| 10,704,569 | B2 * | 7/2020 | Sipola | F15B 11/036 | |
| 12,292,062 | B2 * | 5/2025 | Bertolin | F15B 11/044 | |
| 2010/0037604 | A1 | 2/2010 | Rampen et al. | | |

* cited by examiner

METHOD AND SYSTEM FOR A FLOW-ISOLATED VALVE ARRANGEMENT AND A THREE-CHAMBER CYLINDER HYDRAULIC ARCHITECTURE

CROSS-REFERENCE TO RELATED APPLICATIONS

The present patent application is a continuation of U.S. application Ser. No. 18/701,912 filed Apr. 16, 2024 which is a 35 U.S.C. § 371 Nationalization Application of and claims the priority benefit of the International Patent Application Serial No. PCT/US22/47178 filed Oct. 19, 2022, which is related to and claims the priority benefit of U.S. Provisional Patent Application Ser. No. 63/257,537 filed 19 Oct. 2021 entitled "A THREE-CHAMBER CYLINDER HYDRAULIC ARCHITECTURE"; U.S. Provisional Patent Application Ser. No. 63/257,540 filed 19 Oct. 2021 entitled "FLOW-ISOLATED VALVE ARRANGEMENT"; and U.S. Provisional Patent Application Ser. No. 63/257,545 filed 19 Oct. 2021 entitled "METHOD AND SYSTEM FOR A FLOW-ISOLATED VALVE ARRANGEMENT", the content of each of which is hereby incorporated by reference in its entirety into the present disclosure.

STATEMENT REGARDING GOVERNMENT FUNDING

None.

TECHNICAL FIELD

The present disclosure generally relates to hydraulic architectures, and in particular, to a three-chamber cylinder hydraulic architecture specifically useful in construction machinery as well as a flow-isolated valve arrangement.

BACKGROUND

This section introduces aspects that may help facilitate a better understanding of the disclosure. Accordingly, these statements are to be read in this light and are not to be understood as admissions about what is or is not prior art.

Hydraulic systems utilized in heavy machinery are quite well known. In early days, a simple hydraulic cylinder was utilized to generate a force to move objects based on the hydraulic pressure within the cylinder and the effective area of a piston moving within the cylinder resulting in a load force. In typical cylinders, two chambers are used, each with a respective effective area, such an arrangement creates a force in each direction. The net force resultant of pressurized fluid acting in both areas of the cylinders is typically referred to as a cylinder load. Traditional applications usually act on the flowrate in/out one chamber while the remainder chamber is kept at a pressure as low as possible in order to reduce system losses.

Although the initial concept was quite simple, different hydraulic control architectures were developed over the years, especially as the number of hydraulic actuators per machine increased. Commonly, these architectures have the use of shared hydraulic power supply, e.g., a hydrostatic pump, and control valves dedicated to each actuator. The associated challenges with these architectures are twofold: first, controllability of multiple actuators with a single and shared source of hydraulic power; and second, energy efficiency. While different approaches in the prior art have been successful with regards to the first challenge, most circuits currently available in the market still suffer from low efficiency when powering more than one actuator at a time.

When more than one hydraulic actuator shares the same hydraulic supply, the supplied pressure must be slightly higher than the maximum pressure requirements in the system. Therefore, any other hydraulic actuator requiring lower pressure to achieve the desired load will need throttle control to decrease the supply pressure to the desired level, which leads to power losses. In the present disclosure the term "hydraulic actuator" refers to either rotary or linear actuators. Consequently, any system aiming at energy efficiency will need to minimize the pressure difference between the supply system and the pressure requirements of each one of the multiple actuators sharing the same supply.

To achieve such a condition, it is possible to 1) increase the number of supply pressure rails such that more than one supply pressure is available and 2) increase the number of cylinder chambers such that different combinations of connections between chambers and supply rails can be used to minimize the throttling requirement, therefore reducing system losses. In short, with more options to combine different chamber areas and pressures, it is possible to achieve the same load (effective cylinder force) with a lower difference between supply pressure and chamber pressure, therefore decreasing throttling losses. As a consequence, the higher the number of available combinations, (cylinder modes) the more efficient the cylinder should be, in theory.

The relationship between pressure rails and the number of chambers in achieving discretized number of possible connections between pressure rails and cylinder chambers (modes) for different applications is governed by:

$$\text{Number of Discrete Modes}=(\text{Number of Chambers})^{\text{Number of pressure Rails}}.$$

These different combinations of connections between supply pressures and cylinder chambers are also sometimes referred to as discrete force levels available to the actuator.

An example of such a multi-chamber arrangement is provided in U.S. Pat. No. 10,704,569 to Sipola et al., in which at least a four-chamber actuator was introduced utilizing two pressure rails identified as high pressure (HP) and low pressure (LP). As shown in FIG. 1*a*, each chamber is coupled to each of the pressure rails utilizing a system of valves in parallel. That is, each chamber is coupled to both the high-pressure rail and the low-pressure rail utilizing two separate valves, one between each pressure rail and the chamber. In this case, proportional valves were utilized to synchronize valves opening and closing, but ultimately, non-throttle control was used. Therefore, the proportional valves are kept either fully opened or fully closed, (except during transitions) since any partial opening of the valves would introduce fluid throttling, characterizing throttle control.

Based on the formula provided above, in the example shown in FIG. 1*a*, the number of discretized forces is $4^2$ which equals 16, as shown in FIG. 1*b*, which is a graph of discretized force per an index spanning from 1 to 16. This means that, if non-throttled control is to be used, as described in the '569 patent, only 16 load forces are achievable, limiting the accuracy of speed tracking, specially at low speeds. This is because any mismatch between the load force and the actual actuator force requirement will result in a cylinder acceleration. Therefore, if precise motion control is to be achieved, continuous throttling in at least one of the chambers is required, therefore creating a trade-off between control accuracy and efficiency.

The approach shown in the '569 patent is typical in the prior art (see, e.g., WO 2014081353 A1). However, there are disadvantages with these approaches. For example, the number of chambers in a cylinder and the number of pressure rails (two in the '569 patent) result in a reduced number of discretized forces, while requiring complicated cylinder designs given the higher number of chambers. As mentioned above, in the '569 patent the combination of 4 chambers and two pressure rails resulted in 16 discretized forces. In the WO 2014081353 A1 publication, a five-chamber actuator was used with two pressure rails which can result in 25 discretized forces. However, in all these iterations only two pressure rails were used resulting in a costly and complicated cylinder arrangement with a reduced number of discretized forces. Including an extra pressure rail in the mentioned architectures would also not be cost-effective since a large number of valves would be required.

In addition, both references mentioned use of non-throttle control, or a mix of on/off and proportional valves, which limits achievable efficiency and performance of such systems.

Another aspect to be considered, is that in these types of architectures the cylinder controller constantly changes the supply line connected to each chamber. This means that during a short transient period one valve (i.e., connecting the chamber to the high-pressure line) will be closing while the other one (i.e., connecting the same chamber to the low-pressure line) will be opening. Since these valves are not infinitely fast, both valves will be opened for a short period of time, creating a short circuit between high and low-pressure supply lines. This ultimately causes significant leakages and lowers the system efficiency.

The described short-circuit phenomenon exists regardless of the use of on/off or proportional valves. The rationale for using proportional valves in the mentioned prior art is based on the need to synchronize and delay opening and closing of the valves connecting different rails to a given chamber. Such approach is able to reduce the effect of this short-circuit in the system efficiency. Nevertheless, such a solution is not able to eliminate the problem. In addition, such a solution requires proportional valves with very short closing times and since throttle control was not used the cylinder is still limited to a finite number of available forces.

Therefore, there is an unmet need for a novel approach in hydraulic architecture and its control method such that a more precise motion control can be achieved without significant increase in system losses due to throttle control as well as without increase in cylinder design complexity as well as a novel method and system approach that can provide an isolated flow from pressure rails without a short circuit between any two pressure rails when one pressure rail is switched to the other pressure rail.

SUMMARY

A valve arrangement is disclosed. The valve arrangement includes a plurality of hydraulic rail ports each configured to be coupled to a pressure rail, a plurality of hydraulic chamber ports each configured to be coupled to a chamber of one or more actuators, a plurality of proportional valves each corresponding to one of the plurality of hydraulic chamber ports, wherein each proportional valve includes a rail side coupled to the plurality of hydraulic rail ports and a chamber side coupled to a corresponding hydraulic chamber port, and wherein each rail side of the plurality of proportional valves is divided into a supply side configured to supply hydraulic fluid to a corresponding hydraulic chamber port and a return side configured to receive hydraulic fluid from the corresponding hydraulic chamber port, one or more sets of on-off valves and check valves coupling two or more hydraulic rail ports to each of the supply sides of each of the plurality of proportional valves, and one or more sets of on-off valves and check valves coupling two or more hydraulic rail ports to each of the return sides of each of the plurality of proportional valves. Selectively operating each of the on-off valves and the proportional valves provides selective pressure or flow to each one of the plurality of hydraulic chamber ports.

A hydraulic circuit is also disclosed. The hydraulic circuit includes one or more i) linear; or ii) rotary hydraulic actuator each with one or more cylinder chambers disposed therein, a plurality of pressure rails, each at a corresponding pressure, and a valve arrangement. The valve arrangement includes a plurality of hydraulic rail ports each configured to be coupled to a pressure rail, a plurality of hydraulic chamber ports each configured to be coupled to a chamber of one or more actuators, a plurality of proportional valves each corresponding to one of the plurality of hydraulic chamber ports, wherein each proportional valve includes a rail side coupled to the plurality of hydraulic rail ports and a chamber side coupled to a corresponding hydraulic chamber port, and wherein each rail side of the plurality of proportional valves is divided into a supply side configured to supply hydraulic fluid to a corresponding hydraulic chamber port and a return side configured to receive hydraulic fluid from the corresponding hydraulic chamber port, one or more sets of on-off valves and check valves coupling two or more hydraulic rail ports to each of the supply sides of each of the plurality of proportional valves, and one or more sets of on-off valves and check valves coupling two or more hydraulic rail ports to each of the return sides of each of the plurality of proportional valves. Selectively operating each of the on-off valves and the proportional valves provides selective pressure or flow to each one of the plurality of hydraulic chamber ports. The hydraulic circuit further includes a controller configured to receive one or more desired functional parameters for the one or more cylinder chambers and in real-time i) receive data from a plurality of sensors associated with the one or more cylinder chambers, and ii) activate and deactivate the plurality of proportional valves and the associated on-off valves to achieve the one or more desired functional parameters.

A hydraulic control system for use with heavy machinery is also disclosed. The hydraulic control system includes at least one hydraulic actuator each with a plurality of chambers disposed therein, a plurality of hydraulic pressure rails including i) a high-pressure rail, ii) a medium pressure rail, and iii) a low-pressure rail, a plurality sets of proportionally controlled hydraulic valves each set for and coupled to each of the at least one hydraulic actuator, wherein each of the plurality of chambers of each of the at least one actuator is coupled to the plurality of hydraulic pressure rails via each said plurality of sets of proportionally controlled hydraulic valves, wherein continuous force control is achieved by proportionally controlling an opening area of each of the plurality of sets of proportionally controlled hydraulic valves, and a control unit configured to adjust the corresponding opening area of each of the plurality of sets of the proportionally controlled hydraulic valves such that a closed loop-pressure control is achieved by fluid throttling in each one of the plurality of chambers of the at least one hydraulic actuator.

DETAILED DESCRIPTION

Figure 1A:
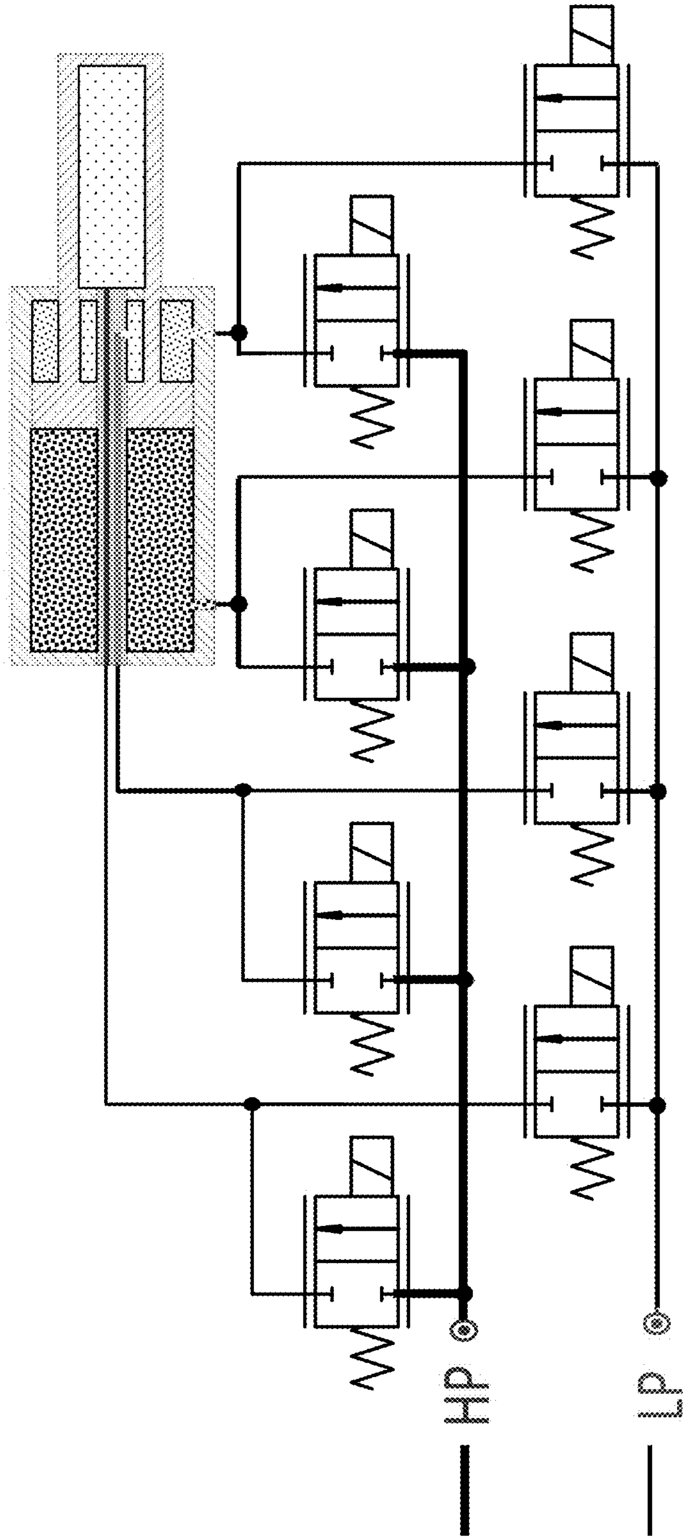
FIG. 1a (Prior Art)
FIG. 1*a* is schematic of a hydraulic circuit according to the prior art.
Figure 1B:
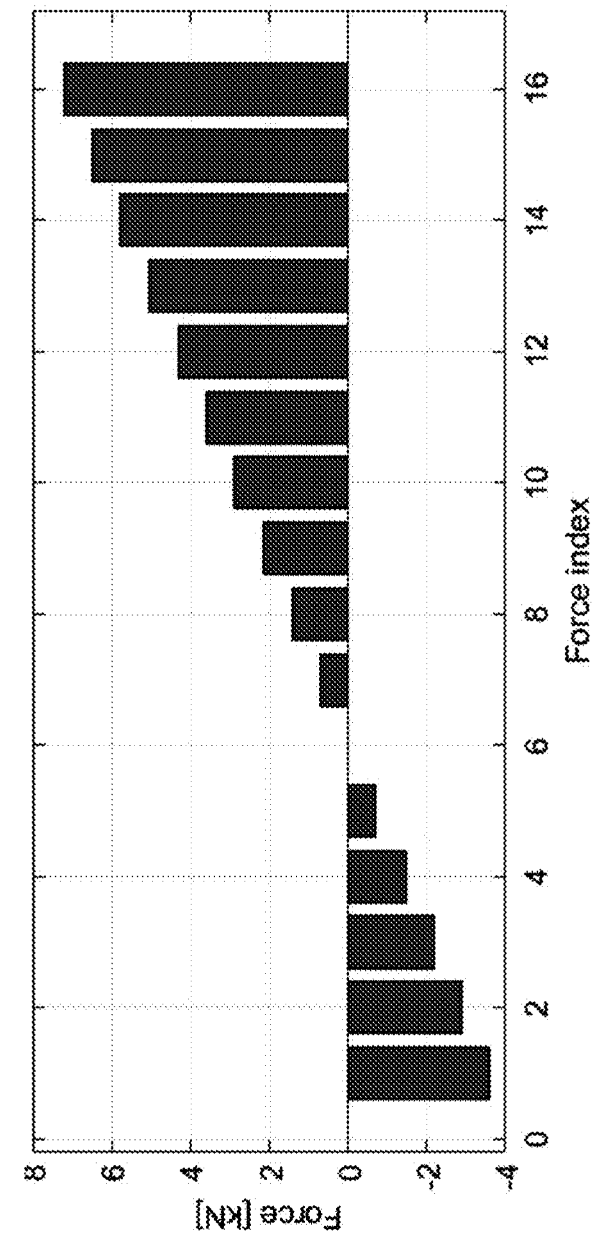
FIG. 1b (Prior Art)
FIG. 1*b* is a graph showing the number of discretized forces, according to the hydraulic circuit of FIG. 1*a*.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel valve arrangement in hydraulic architectures is provided herein that can provide independent chamber pressure control with an isolated flow from pressure rails without a short circuit between any two pressure rails when one pressure rail is switched to the other pressure rail. Additionally, a novel method and system approach in hydraulic architectures is provided herein that utilizes the aforementioned novel valve arrangement. Towards this end, reference is made to FIG. 2 in which a schematic of valve arrangement 100 according to the present disclosure is shown. In the embodiment shown in FIG. 2 and all other embodiments of the present disclosure, the valve arrangement includes M hydraulic rail ports $\mathbf{101}_1$, $\mathbf{101}_2$, $\mathbf{101}_3$ each configured to be coupled to a pressure rail (in FIG. 2, M=3 including high pressure (HP) 102, medium pressure (MP) 104, and low pressure (LP) 106), N hydraulic chamber ports each configured to be coupled to a chamber of an actuator, and N or 2N proportional valves 110 (in FIG. 2, N=1). Each proportional valve includes a rail side 112 that can be coupled to up to M hydraulic rail ports and a chamber side that is coupled to a corresponding hydraulic chamber port 108. When N proportional valves are used, each rail side of the N proportional valves is divided into a supply side that is configured to supply hydraulic fluid to a corresponding hydraulic chamber port and a return side configured to receive hydraulic fluid from the corresponding hydraulic chamber port. It is also possible to use 2N 2-way valves, one connecting the chamber to the supply side and the other connecting the chamber to the return side. In addition, the valve arrangements of the present disclosure include X sets of on-off valves $\mathbf{120}_1$, $\mathbf{120}_2$ and check valves $\mathbf{122}_1$, $\mathbf{122}_2$ that couple two or more hydraulic rail ports $\mathbf{101}_1$, $\mathbf{101}_2$, $\mathbf{101}_3$ to each of the supply sides 116 of each of the N proportional valves 110 (in FIG. 2, X=2). X has a maximum number of M−1 (in this case M=3 and X=2). X has a minimum number of 1. Furthermore, the valve arrangements of the present disclosure include Y sets of on-off valves $\mathbf{124}_1$, $\mathbf{124}_2$ and check valves $\mathbf{126}_1$, $\mathbf{126}_2$ that couple two or more hydraulic rail ports $\mathbf{101}_1$, $\mathbf{101}_2$, $\mathbf{101}_3$ to each of the return sides 118 of each of the N proportional valves 110 (in FIG. 2, Y=2), has a maximum number of M−1. Y has a minimum number of 1. As discussed below, selective operation of each of the on-off valves and the proportional valves provides accurate and efficient pressure-control to each one of the N hydraulic chamber ports.

Additionally, the on-off valves $\mathbf{120}_1$, $\mathbf{120}_2$ and the check valves $\mathbf{122}_1$, $\mathbf{122}_2$ on the supply side 116 of each of the N proportional valves 110 cooperate to selectively define a pressure in the supply side 116 of the proportional valve 110. Furthermore, the on-off valves $\mathbf{120}_1$, $\mathbf{120}_2$ and the check valves $\mathbf{122}_1$, $\mathbf{122}_2$ on the supply side 116 of each of the N proportional valves 110 cooperate to prevent fluid flow between a hydraulic rail port $\mathbf{101}_1$, $\mathbf{101}_2$, $\mathbf{101}_3$ with a first pressure to a hydraulic rail port $\mathbf{101}_1$, $\mathbf{101}_2$, $\mathbf{101}_3$ with a second pressure, wherein the first pressure is higher than the second pressure. Yet additionally, the on-off valves $\mathbf{124}_1$, $\mathbf{124}_2$ and the check valves $\mathbf{126}_1$, $\mathbf{126}_2$ on the return side 118 of each of the N proportional valves 110 cooperate to selectively define a pressure in the return side 118 of the proportional valve 110. Yet furthermore, the on-off valves $\mathbf{124}_1$, $\mathbf{124}_2$ and the check valves $\mathbf{126}_1$, $\mathbf{126}_2$ on the return side 118 of each of the N proportional valves 110 cooperate to prevent fluid flow between a hydraulic rail port $\mathbf{101}_1$, $\mathbf{101}_2$, $\mathbf{101}_3$ with a first pressure to a hydraulic rail port $\mathbf{101}_1$, $\mathbf{101}_2$, $\mathbf{101}_3$ with a second pressure, wherein the first pressure is higher than the second pressure.

As discussed above, the valve arrangement 100 shown in FIG. 2 is coupled to three pressure rails: high-pressure rail 102, medium-pressure rail 104, and low-pressure rail 106. These three pressure rails are coupled to a chamber of an actuator via a combination of on/off valves $\mathbf{120}_1$, $\mathbf{120}_2$, $\mathbf{124}_1$, $\mathbf{124}_2$ (shown as 1V2, 1V3, 1V7, and 1V9) and check valves $\mathbf{122}_1$, $\mathbf{122}_2$, $\mathbf{122}_1$, $\mathbf{122}_2$ (shown as 1V4, 1V5, 1V6, and 1V8) as well as the proportional valve 110 (shown as 1V1). In the embodiment shown, an inlet port 130 of the 3/3 proportional valve 110 (1V1) is coupled to the high-pressure rail 102 through the on/off valve $\mathbf{120}_1$ (1V2). The same port is also coupled to the medium pressure rail 104 through on/off valve $\mathbf{120}_2$ (1V3) and check valve $\mathbf{122}_1$ (1V4). The inlet port 130 is also coupled to the low-pressure rail 106 through the check valve $\mathbf{122}_1$ (1V5). Similarly, an outlet port 132 of the proportional valve 110 (1V1) is coupled to the high-pressure rail 102 through the check valve $\mathbf{126}_1$ (1V6), to the medium-pressure rail 104 through the on/off valve $\mathbf{124}_2$ (1V9) and check valve $\mathbf{126}_2$ (1V8) and to the low-pressure rail 106 through the on/off valve $\mathbf{124}_1$ (1V7). A pre-loaded check valve 128 identified as 1V10 can be added to avoid cavitation in the chamber. Additionally, a relief valve 130 identified as 1V11 is used as a safety device that limits the maximum pressure in the chamber.

Figure 2:
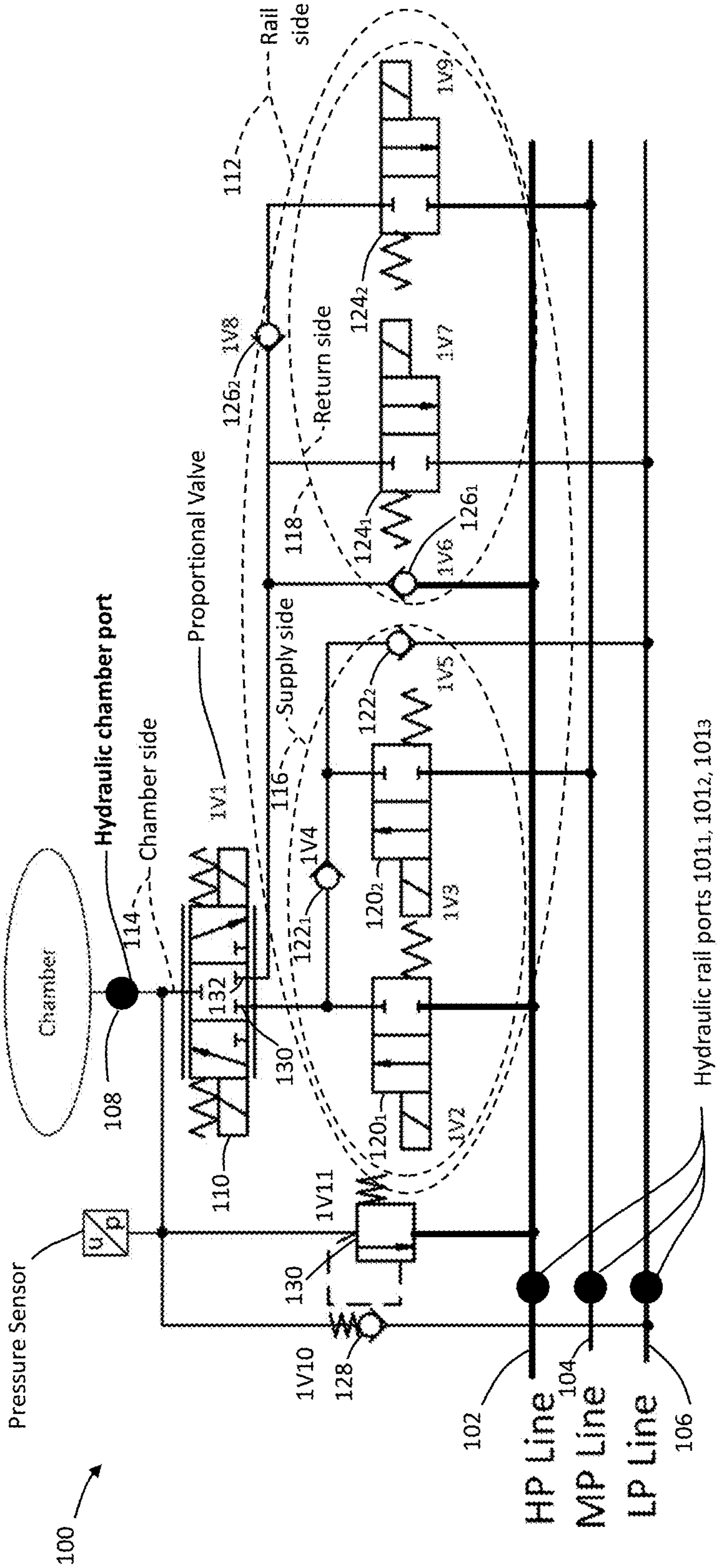
FIG. 2 is a schematic of a valve arrangement, according to the present disclosure.

To better elucidate the operation of the valve arrangement 100 shown in FIG. 2, the following scenario is provided as an example. Suppose the on/off valve $\mathbf{120_2}$ (1V2) is turned on to initially provide high pressure from the high pressure rail 102 to the proportional valve 110 (1V1). If the supply side 116 desires to change the pressure to medium pressure by coupling the proportional valve 110 (1V1) to the medium pressure rail 104, the on/off valve $\mathbf{120_1}$ (1V2) is deactivated while at the same time the on/off valve $\mathbf{120_2}$ (1V3) is activated. The issue of short-circuit described above with respect to the prior art is alleviated by the check valves $\mathbf{122_1}$ (1V4) and $\mathbf{122_2}$ (1V5) whereby high pressure fluid from the proportional valve 110 (1V1) is cut off from the medium pressure rail 104 (MP Line) and the low pressure rail 106 (LP Line) by way of the check valves $\mathbf{122_1}$ (1V4) and $\mathbf{122_2}$ (1V5), respectively.

It should be appreciated that the arrangement 100 shown in FIG. 2 is for example only. The valve arrangement of the present disclosure can include more or less number of pressure rails. It should also be noted that different valve assemblies may be possible while using the same concept. For example, depending on the application it may not be necessary to couple both inlet/outlet ports 130/132 of the proportional valve 110 (1V1) to all three pressure rails. In that scenario, the number of on/off valves may be reduced. Examples of such circuits are shown in FIGS. 3*a*, 3*b*, and 3*c*, each of which provide an example of a hydraulic circuit.

Figure 3A:
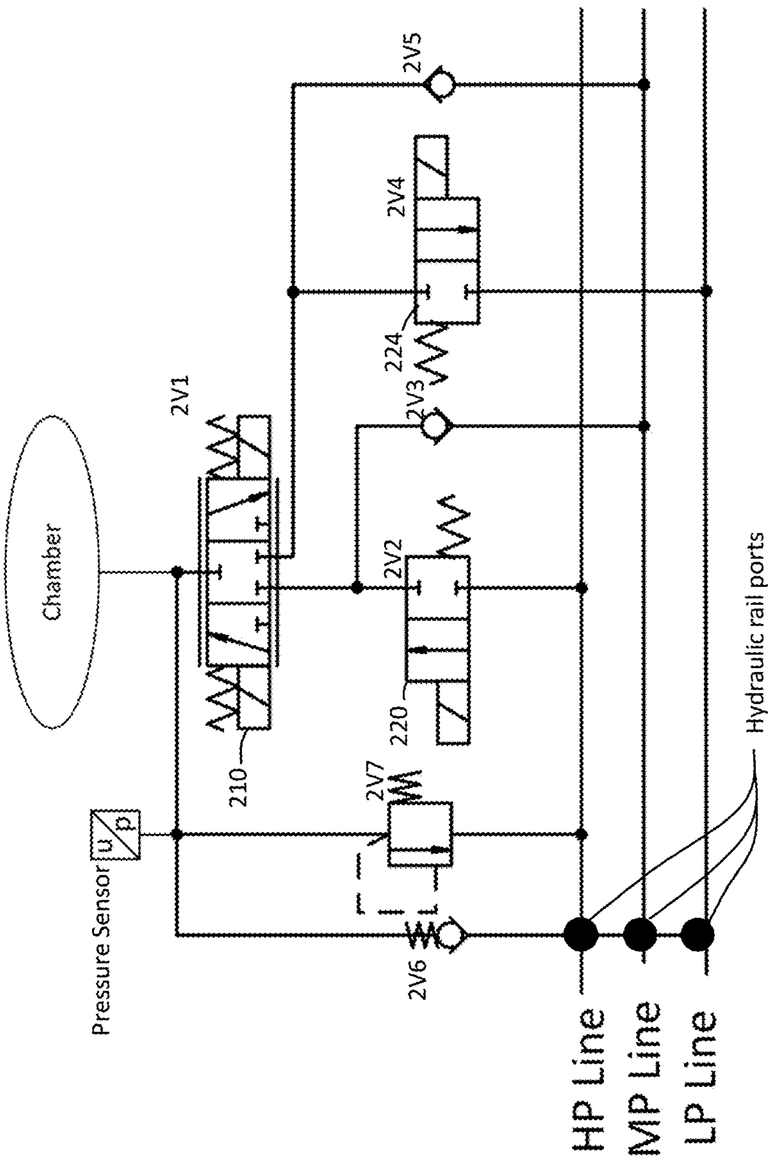
FIGS. 3*a*, 3*b*, and 3*c* are hydraulic circuits, according to the present disclosure.
Figure 3B:
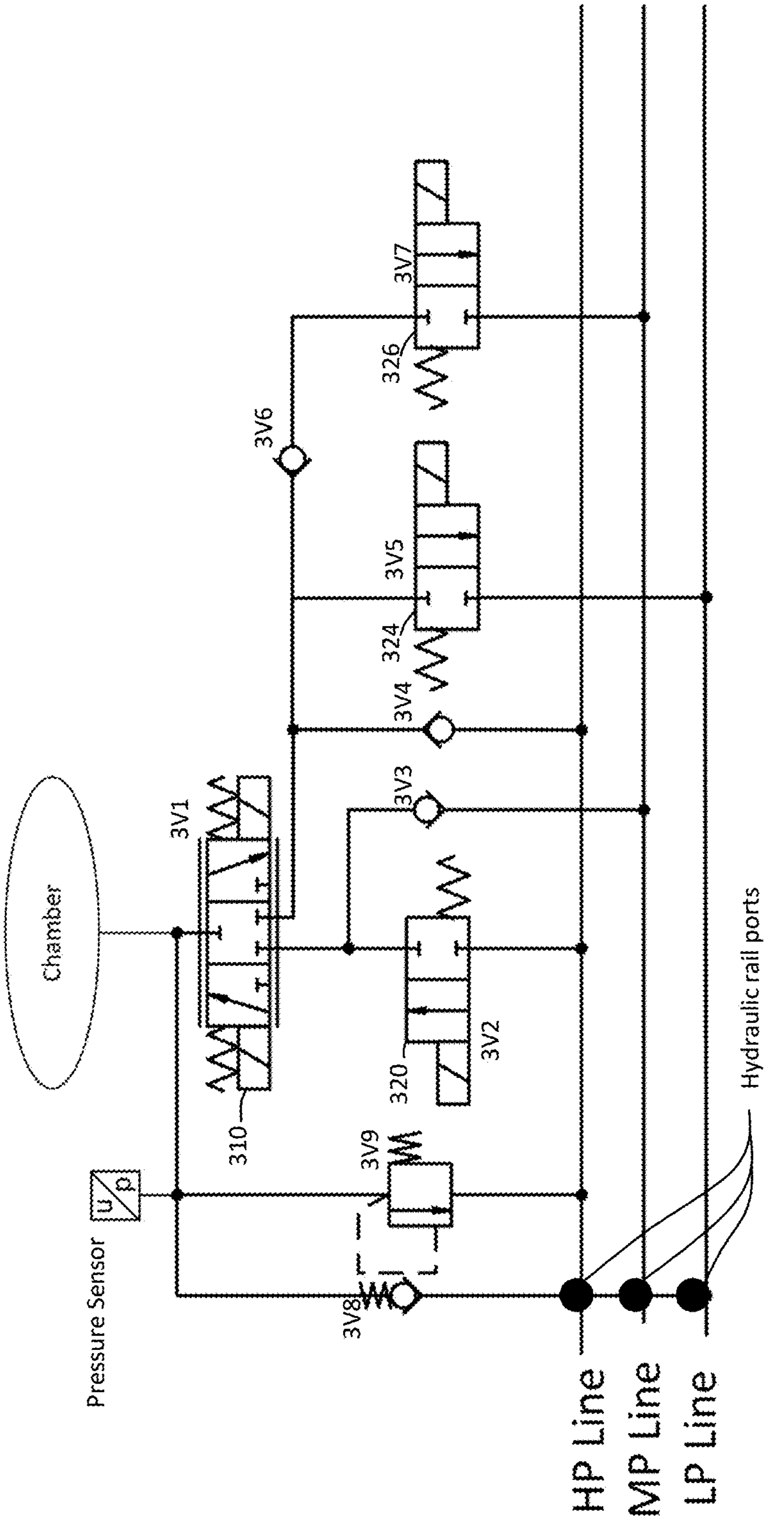
Figure 3C:
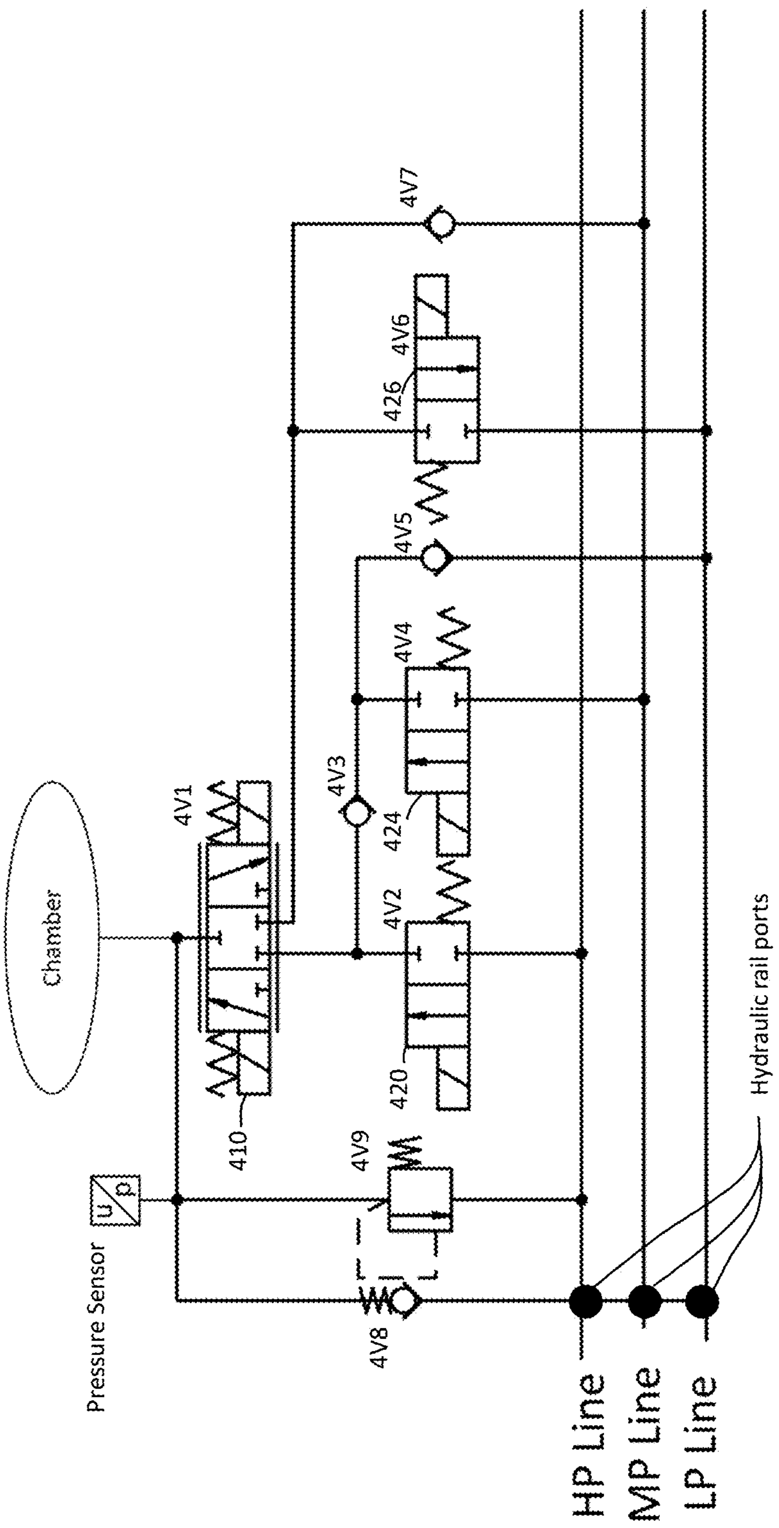

FIG. 3*a* is similar to FIG. 2 in that a proportional valve 210 (2V1) is coupled to two on/off valves 220 (2V2) and 224 (2V4). FIG. 3*b* is similar to FIG. 2 in that a proportional valve 310 (3V1) is coupled to three on/off valves 320 (3V2), 324 (3V4), and 326 (3V7). FIG. 3*c* is similar to FIG. 2 in that a proportional valve 410 (4V1) is coupled to three on/off valves 420 (4V2), 424 (4V4), and 426 (4V6).

Figure 4:
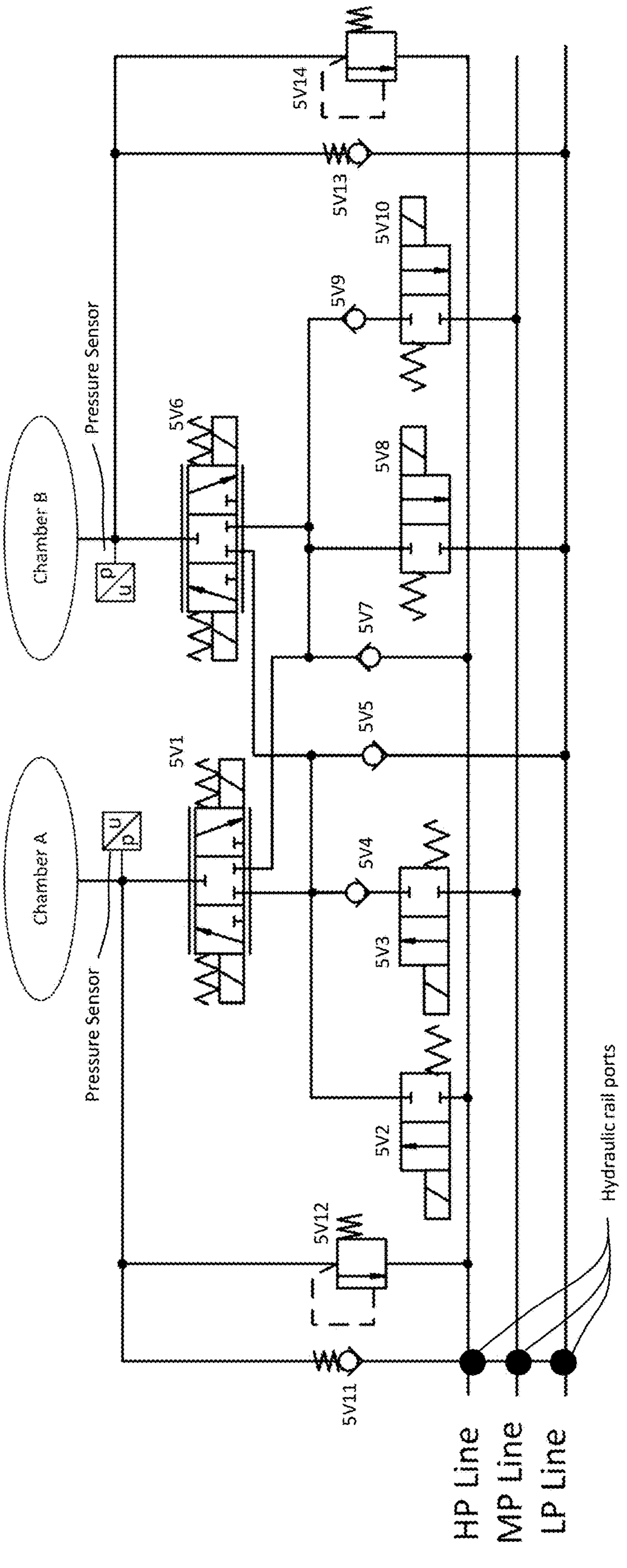
FIG. 4 is a schematic of an embodiment of the valve arrangement according to the present disclosure with 2 chambers with flow in opposite directions.

Similarly, when two chambers with flow in opposite directions (i.e. a cylinder with 2 opposing chambers), it is possible that the two associated proportional valves coupled to each chamber share the same set of on/off and check valves, as shown in FIG. 4 which provides a schematic of an embodiment of the valve arrangement according to the present disclosure with 2 chambers with flow in opposite directions.

In the present disclosure the valve arrangement 100 of FIG. 2, or its possible variations within the skill set of a person having ordinary skill in the art, is used for controlling pressure within linear actuator chambers. It should be highlighted that it is also possible to expand the concept to architectures with more than 2 chambers, by replicating the configuration shown in FIG. 2 and/or FIG. 4 as necessary depending on the application needs. An example of a system with multiple chambers is presented in FIG. 5, which provides a schematic of an embodiment of the valve arrangement according to the present disclosure in a system with 3 chambers.

Figure 5:
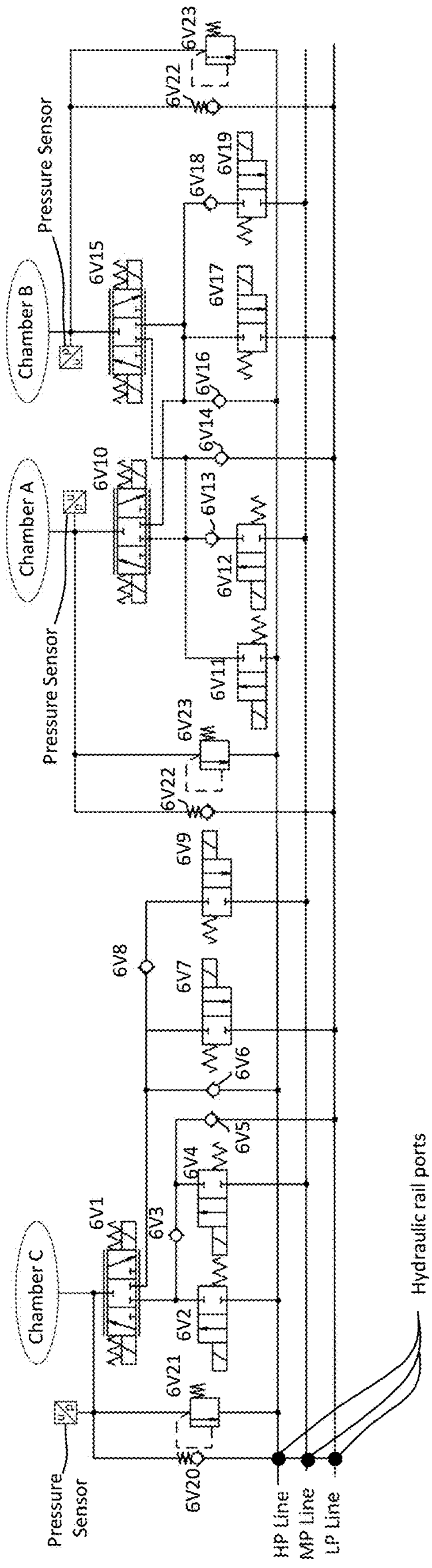
FIG. 5 is a schematic of an embodiment of the valve arrangement according to the present disclosure in a system with 3 chambers.

With reference to FIG. 5, suppose the multi-chamber cylinder is extending, with chambers A and C expanding and chamber B retracting. A control mechanism responsible for operating the valves is commanded to move proportional valve 6V10 to stay between the center and left-most position such that it connects the chamber side to the supply side of the proportional valve and the respective chamber pressure can be controlled as desired with flow from the rails to the chamber. Similarly, the proportional valve 6V15 is kept between the center and right-most positions, connecting its respective chamber side to the return side and controlling the pressure in its respective chamber, with flow from the chamber to the rails.

To minimize throttling losses across valve 6V10, a supervisory controller selects between the available pressure levels in the supply side of the proportional valve and commands the state of the on/off valves 6V11 and 6V12. Similarly, to minimize the throttling losses across the valve 6V15, the controller selects between the available pressure levels in the return side, determining the state of the on/off valves 6V17 and 6V19. The set of valves connected to chamber C are controlled in a similar fashion to those of chamber A and the remaining on/off valves 6V7 and 6V9 remain closed.

During cylinder retraction, the operation is similar. However, in this case the proportional valve 6V10 will be between the center and right-most position, connecting chamber A to the return side, while the proportional valve 6V15 will be between center and left-most position, connecting chamber B to supply side. The pressure in chamber C is controlled in a similar fashion to those of chamber A, with its own dedicated set of valves. Should a fourth chamber be added to the cylinder in the opposing direction to that of chamber B, it could also share the set of on/off and check-valves used to supply the proportional valve 6V1.

The valve arrangement of the present disclosure for controlling pressure within a multi-chamber cylinder provides several advantages over the arrangements of the prior art discussed above. First, the valve arrangement of the present disclosure avoids any short-circuit between the pressure rails when the valves are switched from one pressure rail to another. At the same time, no complex control mechanism is needed to properly delay the valves as further discussed above. This simple and elegant architecture allows for immediate switching between the pressure rails (high-pressure rail to medium-pressure rail; medium-pressure to low-pressure rail; high-pressure to low-pressure; medium-pressure rail to high-pressure rail; and medium-pressure rail to low-pressure rail) without any cross-talk or short-circuit between the rails, while still granting independent pressure control in each one of the multi-chamber cylinder chambers, since the proportional valve provides a degree of pressure control downstream. Therefore, by adjusting the proportionality of the opening of the valve, fine-tune control is achievable given a supply and return rail selection. Second, only a single proportional valve is needed per chamber, instead of 2 or sometimes 3 like in the prior art. This approach results in a further advantage of lowering cost as well as control complexity.

Figure 6:
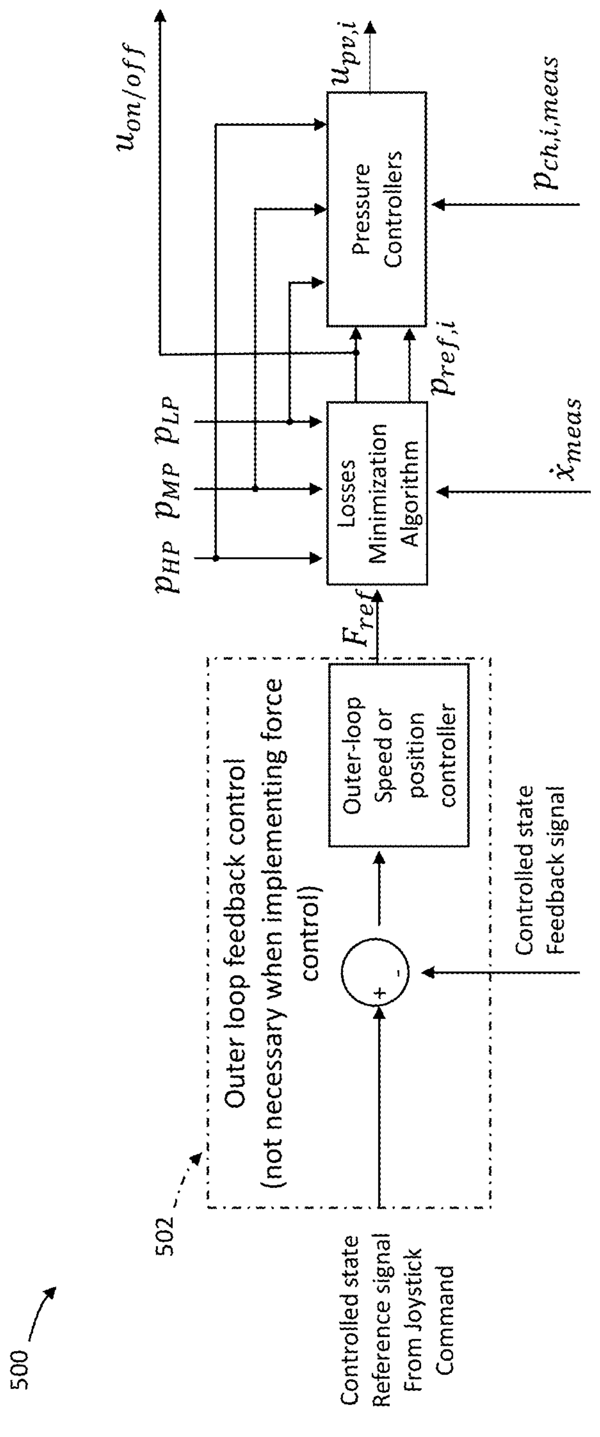
FIG. 6 is a schematic of a control scheme for the valve arrangement of the present disclosure, according to one embodiment.
Figure 7:
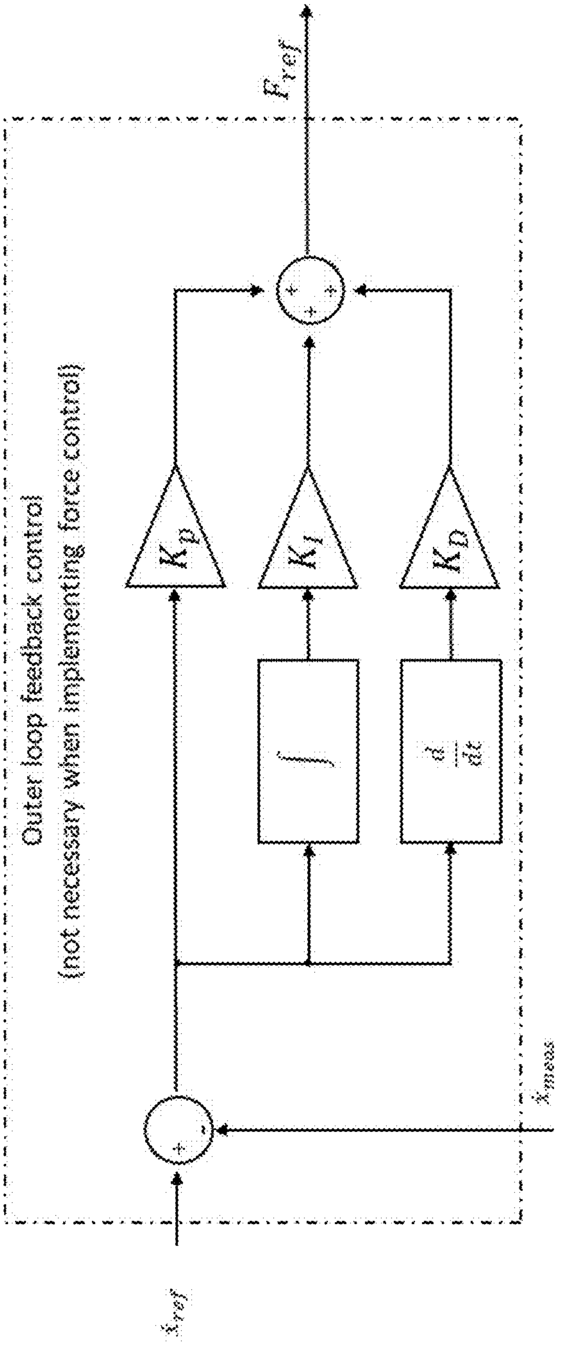
FIG. 7 is a schematic of a block diagram representing an outer loop control shown in FIG. 6.

According to one embodiment, a control scheme 500 for these three valve arrangements is shown in FIG. 6. Although direct force control is also possible, the example is shown with an additional outer-loop controller 502 that can be used. The outer loop evaluates the difference between a reference signal for the state to be controlled and its actual measurement. Position (x) or speed ($\dot{x}$) control are achieved with a PID controller, that adjusts the reference force command as shown in FIG. 7. The gain $K_p$ scales to error to create a control input proportional to error of the controlled state (speed in the example shown), while the gains $K_I$ and $K_D$ act on the tracking error integral and derivative respectively. All the three controller components are them summed to generate a force command, which is sent to a force mode selection algorithm.

Figure 8A:
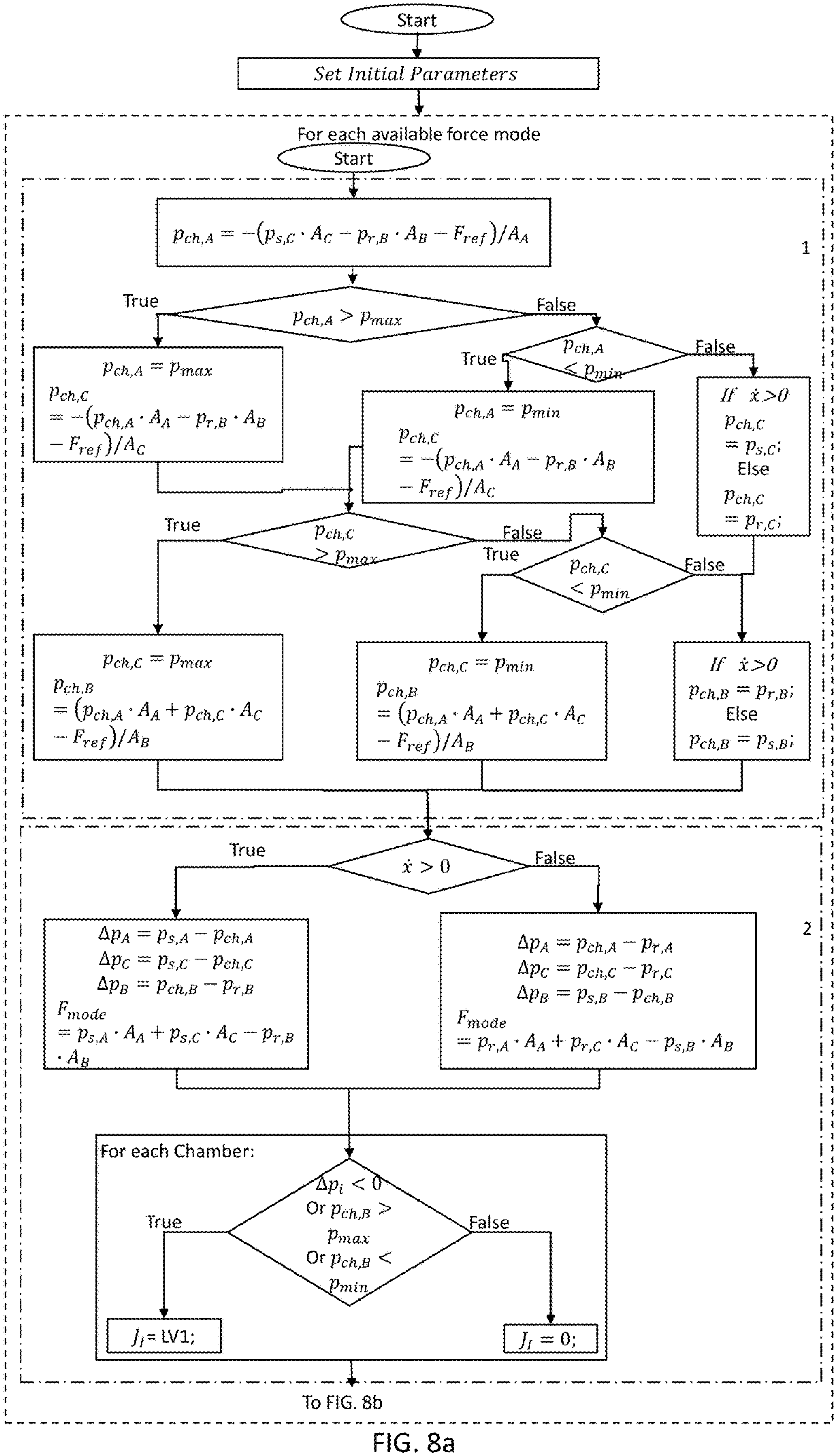
FIGS. 8*a* and 8*b* represent a single flowchart spread over two pages showing control scheme, according to the present disclosure.
Figure 8B:
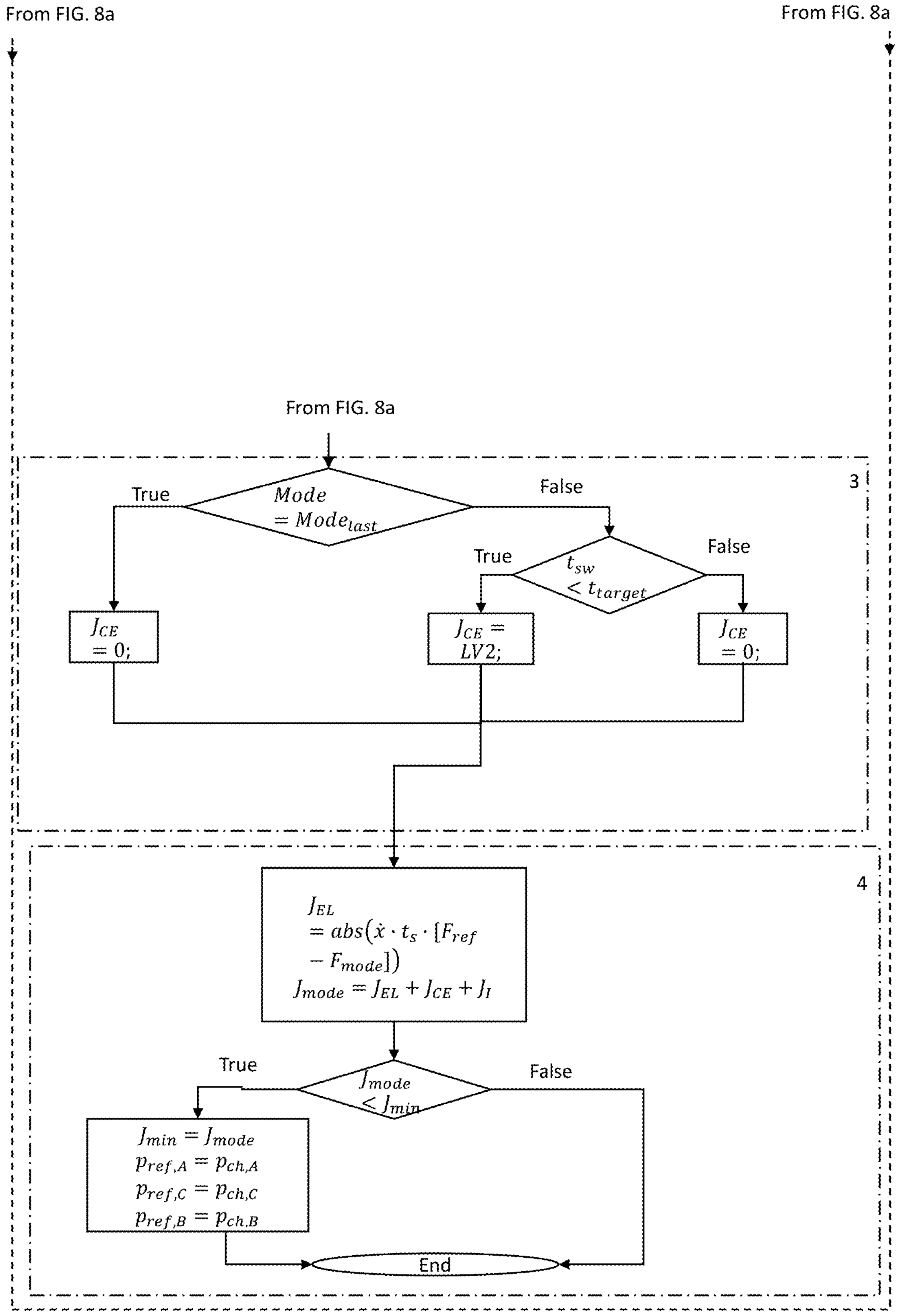

The force mode selection algorithm receives the desired cylinder force, as well as the rails pressures and the cylinder speeds. It then selects the state of each on/off valves ($u_{on/off}$) such that energy losses are minimized. A diagram of the algorithm is shown in FIGS. 8*a* and 8*b* which are two figures splitting the algorithms into two pages. With respect to the diagram and other figures provided herein, the variables provided therein are defined in Table-1, below.

TABLE 1

| Definition for variables used in figures of the present disclosure | |
|---|---|
| $A_A$, $A_B$ and $A_C$ | Effecctive areas of chambers A, B and C respectively, with chambers A and C acting in the positive direction and chamber B acting in the negative direction |
| $p_{ch,A}$, $p_{ch,B}$ and $p_{ch,C}$ | Required Pressures in chambers A, B and C |
| $p_{s,A}$, $p_{s,B}$ and $p_{s,C}$ | Supply side pressure in proportional valves connected to chambers A, B and C |
| $p_{r,A}$, $p_{r,B}$ and $p_{r,C}$ | Return side pressure in proportional valves connected to chambers A, B and C |
| $F_{ref}$ | Reference Force Command |
| $p_{max}$ | Maximum pressure allowed in the chamber |
| $p_{min}$ | Minium pressure allowed in the chamber |
| $\dot{x}$ | Actuator |
| $\Delta p_A$, $\Delta p_B$ and $\Delta p_C$ | Pressure drop across proportional valves connected to chamber A, B and C respectively. |
| $F_{mode}$ | Force that would be obtained at a given mode, when the pressure drop across the proportional valve is zero. |
| i | Generic reference to different chamber. Can be either A, B or C |
| Mode | Mode number, in this case 1 ≤ Mode ≤ 27 |
| $Mode_{last}$ | Optimal cylinder mode in previous time step |
| $J_I$ | Penalty applied to infeasible modes |
| $J_{CE}$ | Penalty applied to mode transitions that required large control effort |
| $t_{sw}$ | Time elapsed since previous switch |
| $t_{target}$ | Target time for interval between switches |
| $t_s$ | Controller sampling time |
| $J_{EL}$ | Penalty to energy losses |
| $J_{mode}$ | Total cost associated with a given mode |
| $J_{min}$ | Total cost associated with the mode with minium cost |
| $p_{ref,A}$, $p_{ref,B}$ and $p_{ref,C}$ | Reference pressure commands to chambers A, B and C respectively |

For each available mode, the code evaluates the $$J_{mode} = J_{EL} + J_{CE} + J_I$$

where $J_{EL}$ is a penalty on energy losses, while $J_{CE}$ penalizes the needed control effort for a switch, by avoiding frequent switches and $J_I$ penalizes modes that are not feasible in the current operating condition. The algorithm evaluated $J_{mode}$ for each of the modes available. In FIG. 8*b*, the selection of the optimal solution is carried out in section 4 (block identified as "4"). In addition, since in each mode the pressures $p_{s,A}$, $p_{s,B}$, $p_{s,C}$ and $p_{r,A}$, $p_{r,B}$, $p_{r,C}$ are defined, mode feasibility can be verified by evaluating the pressure differentials needed and achievable across the proportional valve, as highlighted in section 2 of the embodiment. In section 3, the controller penalizes mode switches when the time passed after the previous switch ($t_{sw}$) is lower than a target time interval for the next switch ($t_{target}$). In case constraints or targets are not met, penalties represented by large values (LV1) and (LV2) are used to penalized prohibited modes, therefore avoiding their selection.

The block receives actuator speed measurement which is utilized to evaluate the required amount of throttling losses in each mode. This is carried out by evaluating $$J_{EL} = \text{abs}(\dot{x} \cdot t_s \cdot [F_{ref} - F_{mode}])$$

where $t_s$ is the controller sampling time, and $F_{mode}$ is the resultant cylinder output force that would be available in case no proportional valve was used.

Additionally, the algorithm also evaluates the necessary pressures in each cylinder chamber such that $F_{ref}$ is achieved, as highlighted in section 1. This results in a reference pressure ($p_{ref,i}$) to each cylinder chamber.

Figure 9:
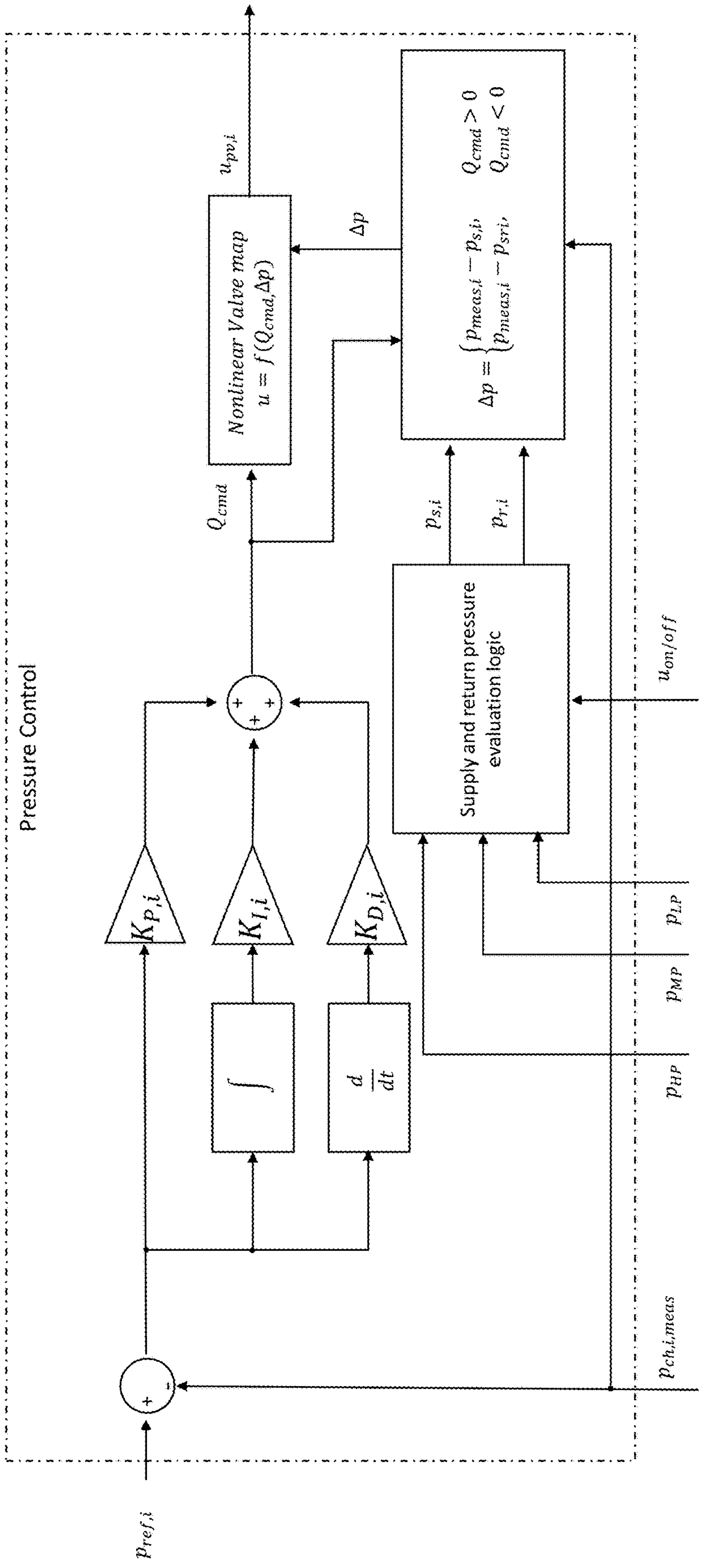
FIG. 9 is a block diagram of pressure control, according to the present disclosure.

Each cylinder chamber has their own local controllers with respective pressures being controlled by means of feedback control as shown in FIG. 9. These controllers also receive information about the commanded states to the on/off valves ($u_{on/off}$) such that the controller knows in advance the pressure in the supply and in return side of the proportional valve. Therefore, based on the received pressure levels at the high-pressure rail ($p_{hp}$), medium pressure rail ($p_{mp}$) and low pressure rail ($p_{lp}$) and on the valves status, the pressure evaluation logic block defines values for the pressure on the supply side ($p_{s,i}$) and on the return side ($p_{r,i}$) of the proportional valve. In this way, the opening of each proportional valve can be electronically compensated when there is a change in pressure either on the supply or in the return side of the proportional valve with a nonlinear valve map that evaluates the necessary valve command such that the desired flowrate is achieved at a given pressure differential. Such pressure differential (Δp) is obtained by evaluating the difference between the measured chamber pressure ($p_{ch,i,meas}$) and the pressure on the supply or return sides. This is necessary because both the supply side pressure and the return side pressure vary depending on the states of the on/off valves. The embodiment also shows a PID controller adjusts the flow command ($Q_{cmd}$) to each chamber based on the values of the controller gains $K_{P,i}$, $K_{I,i}$ and $K_{D,i}$ such that the reference pressure is tracked. This flow command is used as input to the valve nonlinear map, which outputs a command to the respective proportional valve ($u_{pv,i}$)

Figure 10:
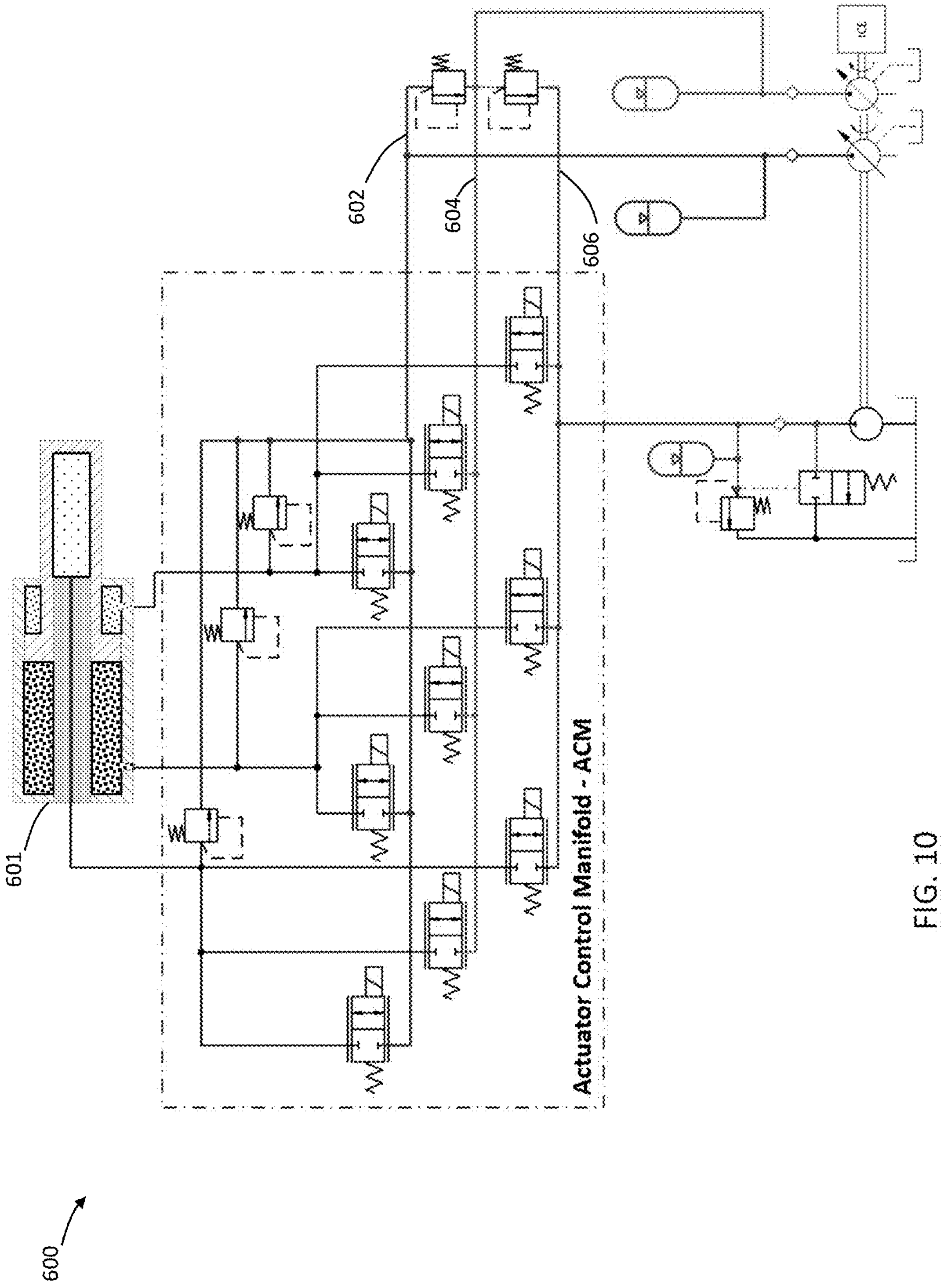
FIG. 10 is a schematic of a hydraulic arrangement for a heavy machinery system including a linear actuator with three chambers and three pressure rails resulting in 27 discretized force modes.
Figure 11:
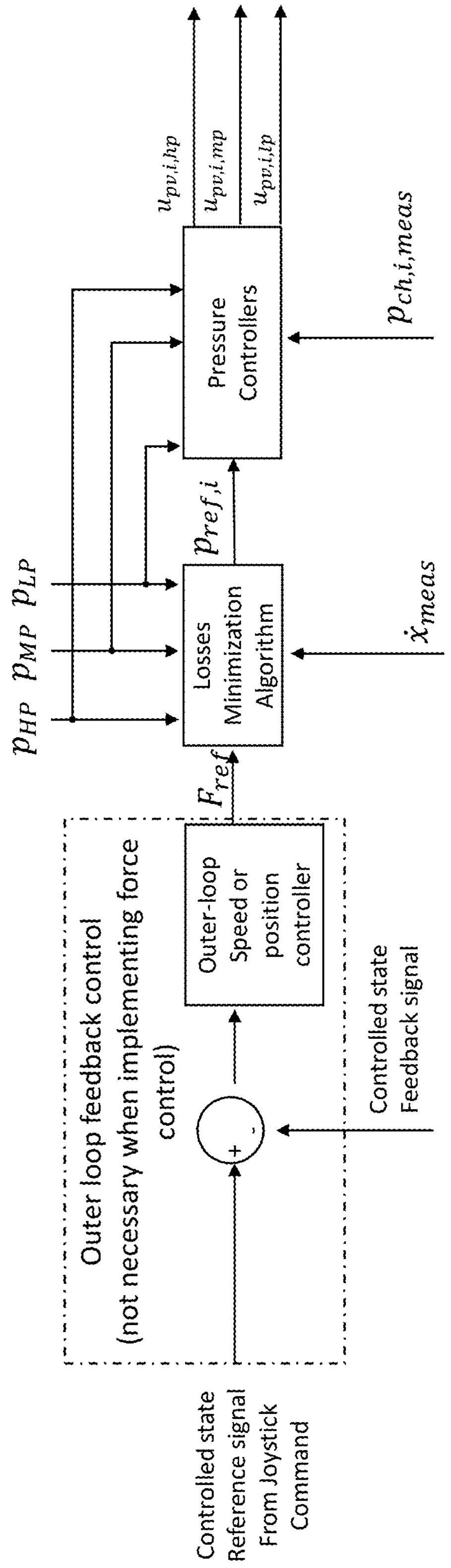
FIG. 11 is a schematic of a control scheme for the hydraulic circuit shown in FIG. 10, according to one embodiment
Figure 12:
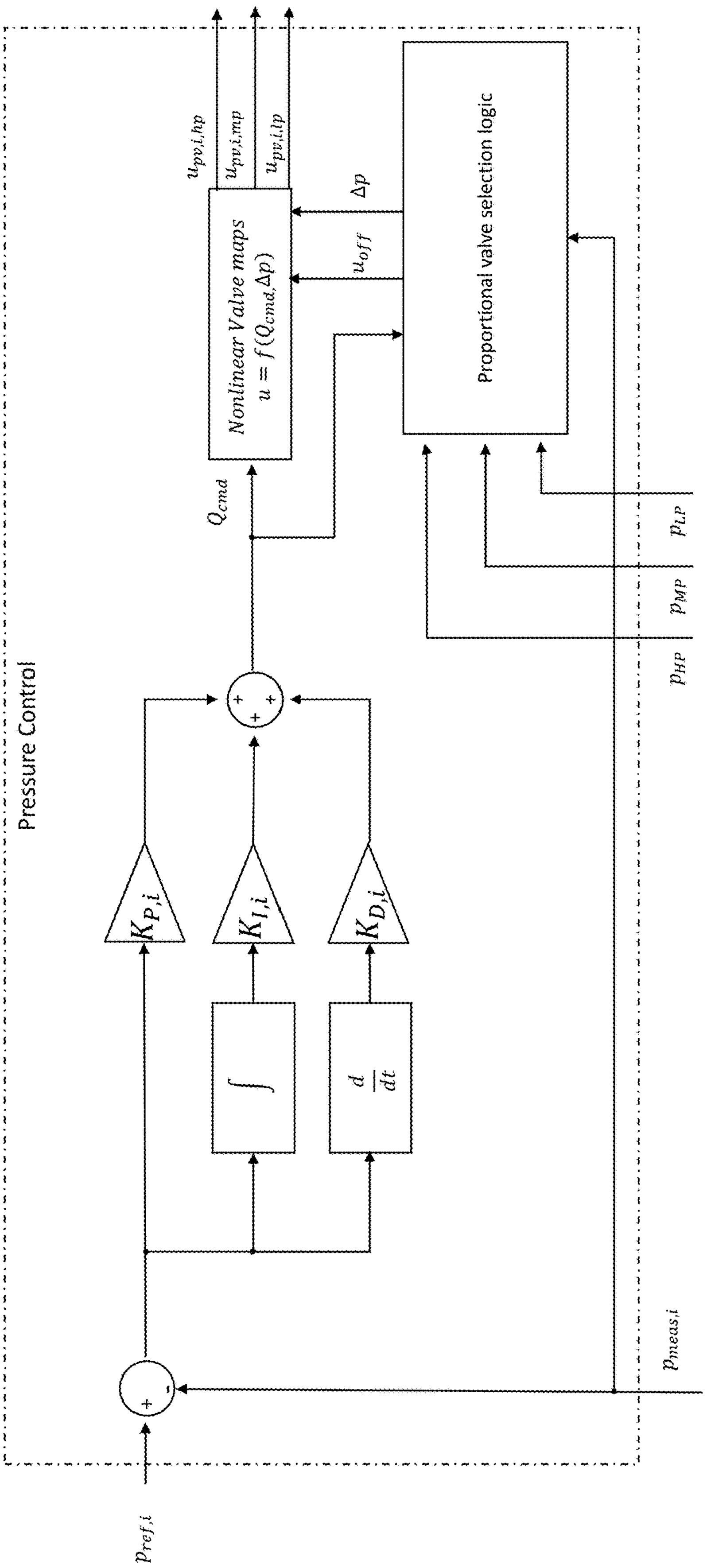
FIG. 12 is a block diagram of pressure control, according to one embodiment of the present disclosure.

Additionally, a novel approach in hydraulic architecture for heavy machinery is presented that can provide a large number of discretized forces without requiring a complicated actuator design. This allows the introduction of small throttle control for fine control adjustments through the proportional valves without a significant increase in the system losses and without the need for a cylinder with a high number of chambers, which can significantly increase cylinder design complexity and impact its reliability. Towards this end, reference is made to FIG. 10 which is a schematic of a hydraulic arrangement 600 for a heavy machinery system including an actuator 601 with three chambers and three pressure rails 602, 604, and 606 resulting in 27 discretized force levels. The hydraulic arrangement 600 in FIG. 10 is shown with one actuator 601, although more-linear or rotary actuators-could be coupled to the same pressure rails. The linear actuator 601 includes three chambers independently controlled by a network of proportional valves (individually not identified for sake of simplicity). Each valve of the network of the proportional valves is responsible for coupling a chamber with one of the actuators to a supply rail. Three rails 602, 604, and 606 are provided, each one at a different pressure level. These different pressure rails are generated by a power source, such as the one shown in FIG. 10 (internal combustion engine (ICE), or by other power generation schemes (e.g., electrical motor, etc.) known to a person having ordinary skill in the art. The pressure in each rail is controlled to remain within predetermined limits defined according to the specific application, and hydraulic accumulators may be used in these lines. Even though, the embodiment represents the system with two variable displacement pumps supplying flow to the pressure rails, it is also possible to develop different configurations for the flow supply to the rails. These can include the use of fixed displacement pumps, or other variations known to those having ordinary skill in the area. With respect to the pressure control in the rails, feedback signals from one of more actuators position, speed, acceleration and/or force can be used to adjust the rails pressure range as well as to vary the flow from a hydraulic flow supply, e.g., a hydrostatic pump. In the shown architecture, therefore, there are 9 proportional valves, which can be either pilot or direct operated. They are coupled to the multi-chamber actuator 601 connecting each chamber to at least two of all the three supply rails 602, 604, and 606. When all chambers are coupled to all three rails, 27 discrete levels of forces ($3^3$) are achieved, and within each level of the 27 discretized levels, a number of micro-adjustments afforded by the proportional valves is made possible. This arrangement provides a superior level of discretization over the prior art by significantly reducing the complexity of the cylinder designs from, e.g., 5 chambers to 3, while yielding a higher number of discrete force availability, therefore increasing the actuator efficiency. In addition, the higher system efficiency yielded by the higher number of force levels available allows the introduction of small throttle control in any of the three chambers for precise motion control while maintaining a high overall system efficiency. In terms of control approach, this architecture has similar structure to that already described in FIG. 6, FIG. 7 and FIGS. 8*a* and 8*b*, with the only difference being the local pressure controller. A top level control block diagram is presented in FIG. 11, with the details of the pressure controller being presented in FIG. 12. In this case, a different valve selection logic is implemented, that selects the valve able to provide the desired flowrate ($Q_{cmd}$) at the lowest pressure drop possible. This block informs the nonlinear valve maps which valves are active and which valves are not ($u_{off}$). The maps then output valve commands to each one of the proportional valves connected to chamber i. Consequently, the main difference is that, in this case, the controller outputs commands to three proportional valves—which are connected to the same chamber—being one connected to the HP pressure rail ($u_{pv,i,hp}$), one connected to the medium pressure rail ($u_{pv,i,mp}$) and one connected to the low pressure rail ($u_{pv,i,lp}$).

Those having ordinary skill in the art will recognize that numerous modifications can be made to the specific implementations described above. The implementations should not be limited to the particular limitations described. Other implementations may be possible.

The invention claimed is:

1. A valve arrangement, comprising:

a plurality of hydraulic rail ports each configured to be coupled to a pressure rail;

a plurality of hydraulic chamber ports each configured to be coupled to a chamber of one or more actuators;

a plurality of proportional valves each corresponding to one of the plurality of hydraulic chamber ports, wherein each proportional valve includes a rail side coupled to the plurality of hydraulic rail ports and a chamber side coupled to a corresponding hydraulic chamber port, and wherein each rail side of the plurality of proportional valves is divided into a supply side configured to supply hydraulic fluid to a corresponding hydraulic chamber port and a return side configured to receive hydraulic fluid from the corresponding hydraulic chamber port;

one or more sets of on-off valves and check valves coupling two or more hydraulic rail ports to each of the supply sides of each of the plurality of proportional valves; and one or more sets of on-off valves and check valves coupling two or more hydraulic rail ports to each of the return sides of each of the plurality of proportional valves, wherein selectively operating each of the on-off valves and the proportional valves provides selective pressure or flow to each one of the plurality of hydraulic chamber ports.

2. The valve arrangement of claim 1, wherein the on-off valves and the check valves on the supply side of each of the plurality of proportional valves cooperate to selectively define a pressure in the supply side of the proportional valve and further cooperate to prevent fluid flow between a hydraulic rail port with a first pressure to a hydraulic rail port with a second pressure, wherein the first pressure is higher than the second pressure.

3. The valve arrangement of claim 1, wherein the on-off valves and the check valves on the return side of each of the plurality of proportional valves cooperate to selectively define a pressure in the return side of the proportional valve and further cooperate to prevent fluid flow between a hydraulic rail port with a first pressure to a hydraulic rail port with a second pressure, wherein the first pressure is higher than the second pressure.

4. A hydraulic circuit, comprising:

one or more i) linear; or ii) rotary hydraulic actuator each with one or more cylinder chambers disposed therein;

a plurality of pressure rails, each at a corresponding pressure;

a valve arrangement, comprising:

a plurality of hydraulic rail ports each configured to be coupled to a pressure rail;

a plurality of hydraulic chamber ports each configured to be coupled to a chamber of one or more actuators;

a plurality of proportional valves each corresponding to one of the plurality of hydraulic chamber ports, wherein each proportional valve includes a rail side coupled to the plurality of hydraulic rail ports and a chamber side coupled to a corresponding hydraulic chamber port, and wherein each rail side of the plurality of proportional valves is divided into a supply side configured to supply hydraulic fluid to a corresponding hydraulic chamber port and a return side configured to receive hydraulic fluid from the corresponding hydraulic chamber port;

one or more sets of on-off valves and check valves coupling two or more hydraulic rail ports to each of the supply sides of each of the plurality of proportional valves; and one or more sets of on-off valves and check valves coupling two or more hydraulic rail ports to each of the return sides of each of the plurality of proportional valves, wherein selectively operating each of the on-off valves and the proportional valves provides selective pressure or flow to each one of the plurality of hydraulic chamber ports; and a controller configured to receive one or more desired functional parameters for the one or more cylinder chambers and in real-time i) receive data from a plurality of sensors associated with the one or more cylinder chambers, and ii) activate and deactivate the plurality of proportional valves and the associated on-off valves to achieve the one or more desired functional parameters.

5. The hydraulic circuit of claim 4, wherein the on-off valves and the check valves on the supply side of each of the plurality of proportional valves cooperate to selectively define a pressure in the supply side of the proportional valve and further cooperate to prevent fluid flow between a hydraulic rail port with a first pressure to a hydraulic rail port with a second pressure, wherein the first pressure is higher than the second pressure.

6. The hydraulic circuit of claim 4, wherein the on-off valves and the check valves on the return side of each of the plurality of proportional valves cooperate to selectively define a pressure in the return side of the proportional valve and further cooperate to prevent fluid flow between a hydraulic rail port with a first pressure to a hydraulic rail port with a second pressure, wherein the first pressure is higher than the second pressure.

7. The hydraulic circuit of claim 4, wherein each of the plurality of pressure rails is sourced from one or more power sources.

8. The hydraulic circuit of claim 7, wherein the power source is one of an internal combustion engine or one or more electric motors.

9. The hydraulic circuit of claim 7, the pressures in the pressure rails are kept at the desired levels by one or more hydrostatic pumps of either fixed or variable displacement.

10. The hydraulic circuit of claim 9, where real-time measured states including pressure, force, torque, position and speed are used to adjust desired pressure levels and associated variation range in the pressure rails.

11. The hydraulic circuit of claim 4, wherein the one or more functional parameters includes one of force, speed, or position.

12. The hydraulic circuit of claim 4, wherein the controller controls the plurality of proportional valves and the associated on-off valves based on minimizing energy losses between the supply side and the return side of each of the plurality of proportional valves.

13. The hydraulic circuit of claim 4, wherein the controller utilizes the data from the plurality of sensors associated with the one or more cylinder chambers in one or more feedback loops.

14. A hydraulic control system for use with heavy machinery, comprising:

at least one hydraulic actuator each with a plurality of chambers disposed therein;

a plurality of hydraulic pressure rails including i) a high-pressure rail, ii) a medium pressure rail, and iii) a low-pressure rail;

a plurality sets of proportionally controlled hydraulic valves each set for and coupled to each of the at least one hydraulic actuator, wherein each of the plurality of chambers of each of the at least one actuator is coupled to the plurality of hydraulic pressure rails via each said plurality of sets of proportionally controlled hydraulic valves, wherein continuous force control is achieved by proportionally controlling an opening area of each of the plurality of sets of proportionally controlled hydraulic valves, and a control unit configured to adjust the corresponding opening area of each of the plurality of sets of the proportionally controlled hydraulic valves such that a closed loop-pressure control is achieved by fluid throttling in each one of the plurality of chambers of the at least one hydraulic actuator.

15. The hydraulic control system of claim 14, wherein each of the at least one hydraulic actuator includes pressure sensors in hydraulic lines upstream and downstream of each of the plurality of sets of the proportionally controlled hydraulic valves.

16. The hydraulic control system of claim 14, wherein position or speed sensors are further included in the closed-loop pressure control.

17. The hydraulic control system of claim 14, wherein at least one of plurality of hydraulic pressure rails is sourced from a power source including at least one hydrostatic pump, and wherein the at least one hydrostatic pump is based on one of fixed or variable displacement.

18. The hydraulic control system of claim 17, wherein the power source further includes one of an internal combustion engine, or one or two electric motors powered by a battery pack.

* * * * *